(12) United States Patent
Shimansky et al.

(10) Patent No.: US 6,427,583 B1
(45) Date of Patent: Aug. 6, 2002

(54) APPARATUS FOR AUTOMATICALLY FRYING FOODSTUFF

(75) Inventors: Chaim Shimansky, Petah Tikva (IL); David Shimansky, Cote St Luc (CA)

(73) Assignee: Speed Fry Corporation, Toronto (CA)

( * ) Notice: Subject to any disclaimer, the term of this patent is extended or adjusted under 35 U.S.C. 154(b) by 0 days.

(21) Appl. No.: 09/371,688

(22) Filed: Aug. 10, 1999

(51) Int. Cl.[7] .................................................. A47J 37/00
(52) U.S. Cl. .............................. 99/404; 99/337; 99/338; 99/407; 99/413; 99/484
(58) Field of Search .......................... 99/404, 407, 413, 99/484, 337, 338

(56) References Cited

U.S. PATENT DOCUMENTS

| | | | | |
|---|---|---|---|---|
| 4,428,280 A | * | 1/1984 | Williams et al. | 99/356 |
| 5,003,868 A | * | 4/1991 | Higgins et al. | 99/357 |
| 5,142,968 A | * | 9/1992 | Caron et al. | 99/404 |
| 5,275,090 A | * | 1/1994 | Connell | 99/336 |
| 5,586,486 A | * | 12/1996 | Nitschke et al. | 99/407 |
| 6,073,540 A | * | 6/2000 | Garrett | 99/404 |

* cited by examiner

Primary Examiner—Milton I. Cano
Assistant Examiner—H. Mai
(74) Attorney, Agent, or Firm—Carter & Schneider, P.A.

(57) ABSTRACT

An apparatus and method for frying food is comprised of a housing provided with a receiving opening in which foodstuff to be fried is inserted. The foodstuff is directed to a perforated frying basket which is displaced upon actuation of a switch by the user into a frying pot containing hot oil. While the basket is in the frying pot, it is being shaken to provide more even cooking and to prevent the foodstuff from sticking together. After the frying cycle the frying basket is displaced to a position above the frying pot where the basket is again shaken to drip oil from the foodstuff and the basket into the frying pot. The basket is then conveyed to a discharge position where a chute directs the fried foodstuff to a discharge opening where a container has been placed to receive the fried foodstuff.

20 Claims, 6 Drawing Sheets

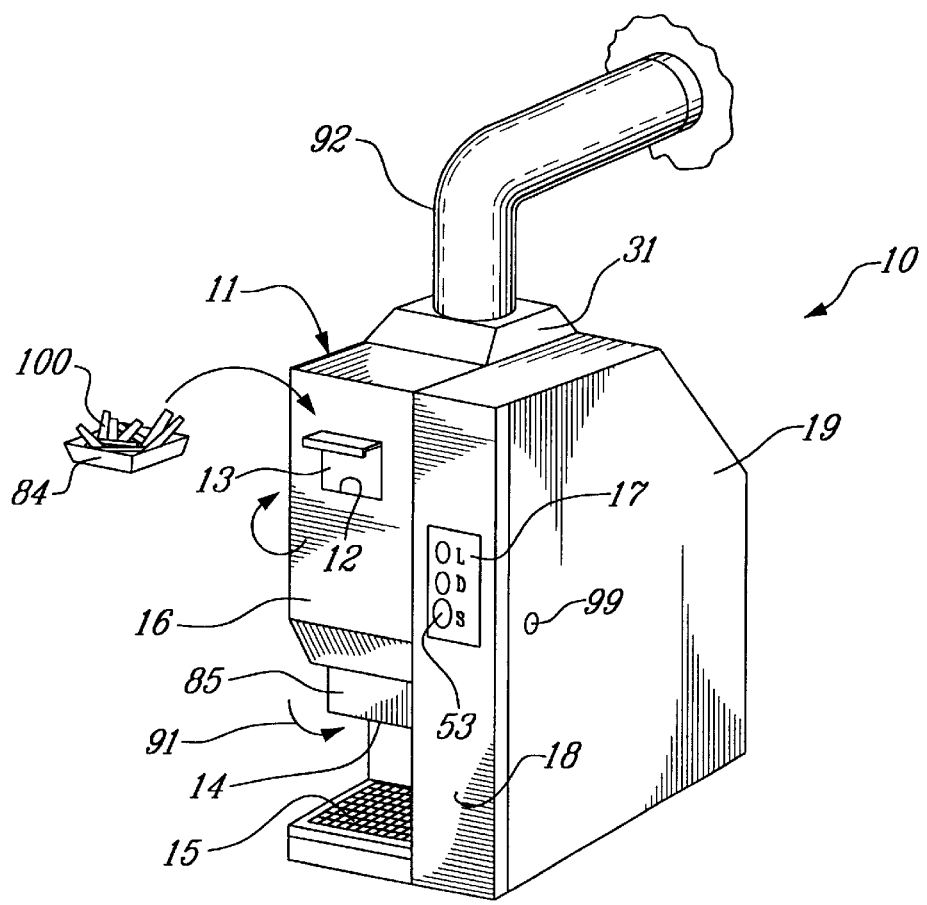
FIG_1
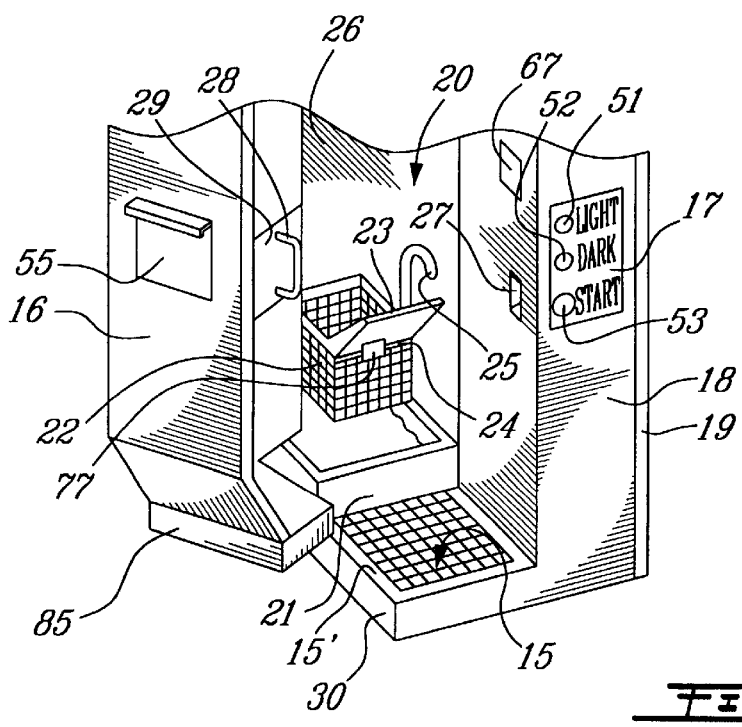
FIG_2

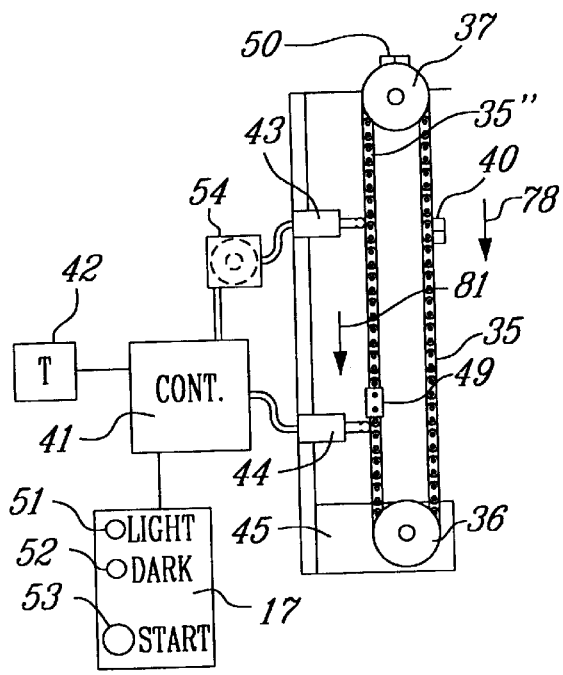
FIG_5
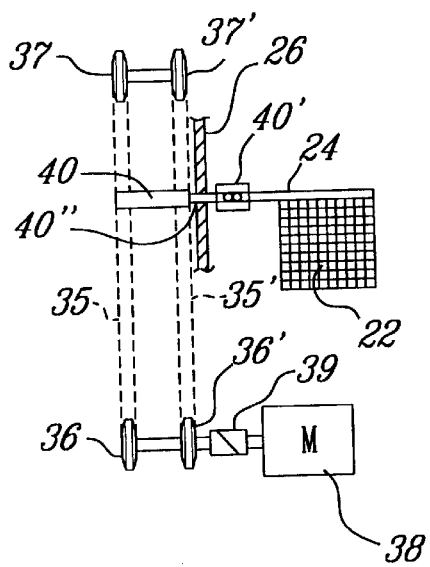
FIG_6
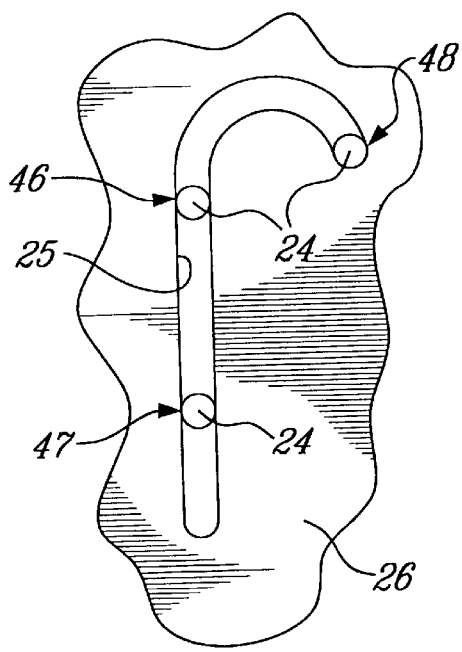
FIG_7
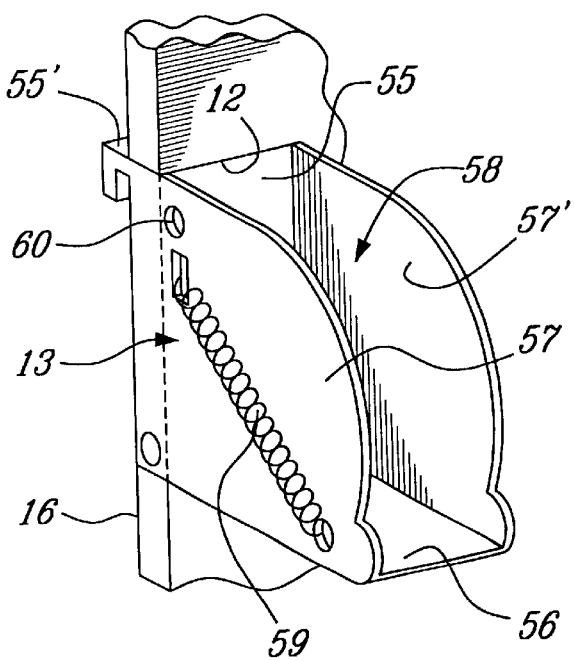
FIG_8

APPARATUS FOR AUTOMATICALLY FRYING FOODSTUFF

TECHNICAL FIELD

The present invention relates to an apparatus and a method for frying food and particularly, but not exclusively, to an automatic french-fries machine and wherein the frying basket containing the foodstuff is shaken during the frying cycle and again shaken at a position above the cooking pot to remove excess oil from the foodstuff and the basket before it is conveyed to a discharge position.

BACKGROUND ART

Various attempts have been made to develop an automatic or semi-automatic machine capable of frying foodstuff, such as french-fries. Known apparatus in the art have encountered several problems and particularly when cooking frozen or semi-frozen products such as french-fries. It has been found that the fries are not uniformly cooked or stick to one another during the frying cycle. Also, some of the known machines cannot dispense proper regular quantities of french-fries when the fries are stored within the machine. It is also found that the fries will also adhere to the cooking basket and therefore cannot be unloaded from within the machine and thereby requiring frequent service calls to render the machine properly operative. Further, these machines produce fries that have an oily taste. The machines consume large quantities of oil thereby requiring that the cooking pot be verified periodically and refilled with oil. Hot cooking oil can prove hazardous and could be harmful to the operator if the machine is not properly constructed with safety features. Another problem with such machines is that they are not well ventilated, they take a large amount of space and are difficult to service and clean.

An example of such prior art machine is described in U.S. Pat. No. 5,325,766. That patent describes some of the disadvantages of the prior art and attempts to solve these problems by providing a machine wherein the frozen products, herein frozen french-fries are stored in a top part of the machine and are delivered to a basket. The french-fries are stored in an enclosure where freezing temperatures prevail. It is required with such machines to have a cold airflow maintained in the enclosure and circulated over an evaporator of a cooling device placed in the enclosure to dry the air and draw out the fries. Accordingly, the machine is bulky and expensive to fabricate and require extensive servicing. The fries are placed in a basket which is in the form of a pivoting spout. The cooking basket is lowered into a cooking pot as part of a rocking phase and then rocked back on its hinge to push a door and discharge the fries outside the unit. When the door is open a fan draws air through the door and through the basket. Such a device does not overcome many of the above-mentioned disadvantages of the prior art and create other disadvantages.

SUMMARY OF INVENTION

It is a feature of the present invention to provide an apparatus and a method for frying food which substantially overcomes the above-mentioned disadvantages of the prior art.

Another feature of the present invention is to provide an apparatus and a method for frying food and wherein the frying basket with the foodstuff to be fried is shaken during the frying process when the basket is inserted into the cooking oil to provide fries which are evenly cooked.

Another feature of the present invention is to provide an apparatus and a method for frying food wherein the frying basket with the foodstuff to be fried is arrested above the cooking pot after the frying cycle and shaken whereby to remove excess oil from the foodstuff and the frying basket and to cause excess oil to drip back into the cooking pot prior to displacing the frying basket to a discharge position.

Another feature of the resent invention is to provide an apparatus and a method for frying food which is easy to service, safe to operate, and which is substantially fully automatic.

According to the above features, from a broad aspect, the present invention provides an apparatus for frying food. The apparatus comprises a housing having a food receiving opening and a discharge port. A food frying pot is provided in the housing with a heating element placed therein to heat frying oil. A perforated frying basket is hingedly secured to a conveying means. A transfer chute is associated with the perforated frying basket. Control means is provided to operate the conveying means to displace the frying basket to a food receiving position, a food frying position, and a food discharge position. The transfer chute directs foodstuff into and out of the frying basket. Basket shaking means is provided to shake the frying basket when disposed at a predetermined location to provide a high quality fried foodstuff. Ventilation means is associated with the housing.

According to a still further broad aspect of the present invention there is provided a method of frying foodstuff and which comprises providing a machine having a housing in which is disposed a food frying pot. The housing has a food receiving opening and a discharge port. A frying basket and a transfer chute are hingedly secured to a conveying means within the machine. The method consists in inserting foodstuff to be fried in the food receiving opening and automatically transferring the foodstuff to be fried to the frying basket by means of the transfer chute. The conveying means conveys the frying basket into the food frying pot for frying the foodstuff for a predetermined period of time. The cooking basket is shaken at one or more predetermined locations. The frying basket is conveyed with the fried foodstuff therein to a food discharge position. The transfer chute receives the fried foodstuff at the discharge position and directs it to a food container disposed at the discharge port.

BRIEF DESCRIPTION OF DRAWINGS

A preferred embodiment of the present invention will now be described with reference to the accompanying drawings in which:

FIG. 1 is a perspective view of the automatic frying apparatus of the present invention;

FIG. 2 is a fragmented perspective view showing the apparatus of FIG. 1 with the front door partly open exposing the frying basket and the cooking pot mounted in the back of the cooking chamber;

FIG. 5 is a schematic side view showing the chain link conveying means and its association with limit switches and the control circuit;

FIG. 6 is an end view of the chain link conveying means showing the pivot rod connection and the motor drive of the conveyor;

FIG. 7 is a fragmented plan view of the guide channel which is provided in the partition wall of the housing and through which the hinge rod projects;

FIG. 8 is a side view showing the construction of the door assembly secured at the food receiving opening of the housing;

DESCRIPTION OF PREFERRED EMBODIMENTS

Figure 3:
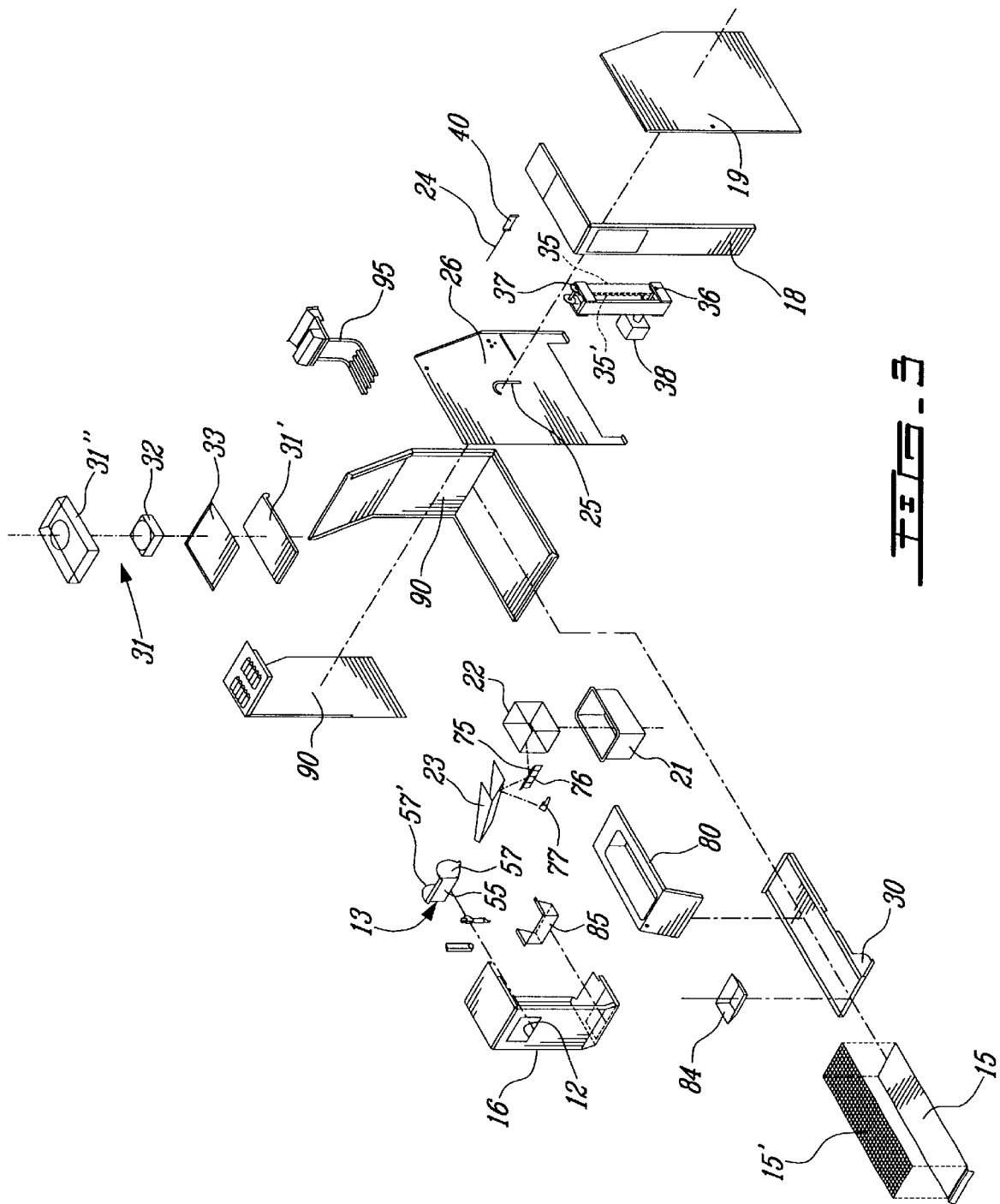
FIG. 3 is an exploded view showing the basic components of the automatic frying apparatus of the present invention.

Referring now to the drawings and more particularly to FIGS. 1 to 3, there is shown generally at 10 the automatic french-frying apparatus of the present invention. Although this apparatus is described as relating to the frying of french-fries, it can also be used to fry many other type foods such as breaded onions, seafood products, other shaped potato goods, vegetables, etc., and should therefore not be limited to its specific application as herein described. The apparatus 10 consists of a housing 11 having a food receiving opening 12 which is hereinshown as closed by a door assembly 13. A discharge port 14 is disposed spaced above a collecting tray 15 which is retractable from under the cooking pot located in the cooking chamber as will be described later. A servicing door 16, with a security lock, provides access to the cooking chamber 20. A control panel 17 is mounted on the front wall 18 of the apparatus. A side service door 19 also provides access to the control circuits, the motors and the chain conveyor as well as other devices.

As shown in FIG. 2, when the servicing door 16 is open, there is provided access to the cooking chamber 20. A cooking pot 21 in which hot oil is disposed is located in the back bottom portion of the cooking chamber 20 on a support frame. A perforated frying basket 22 and an associated transfer chute 23 are connected to a hinge connection member, herein a conveyor rod 24 which is displaceable in a guide slot 25 formed in a division wall 26 separating the cooking chamber 20 from the conveyor and electronics circuitry located in an adjacent components chamber. The frying basket 22 is detachably secured in the cooking chamber 20 by a rod coupling 40' securing the conveyor rod to a displaceable protruding rod end 40".

As shown in FIG. 2, a door position sensor switch 27 is engageable by an actuating arm 28 secured to a side wall 29 of the door assembly 13 and disables the control circuit, as will be described later, of the system when the door 16 is open. When the door is closed, this actuating arm 28 engages the sensor switch 27 and places the control circuit in an operative state.

As shown in FIG. 2, the collecting tray 15 may be pulled out from its bottom support 30 to collect debris which may have fallen thereon under the discharge port 14 or oil that may have collected thereon under the cooking pot 21. Accordingly, the machine is easy to clean without having to open the door 16. A lattice screen 15' is removable from the top of the collecting tray 15, as shown in FIG. 3.

As is also shown in FIGS. 1 to 3, the housing is provided with a ventilator assembly 31 which comprises a fan 32 and a carbon filter 33 which can be periodically removed and cleaned, as is better seen in FIG. 3. It is pointed out that many of the elements of the apparatus are constructed from stainless steel for sanitary purpose and for ease of cleaning.

With particular reference now to FIGS. 3 to 8, there will be described the construction of the conveying means and the perforated frying basket and transfer chute hingedly secured thereto. As shown in FIGS. 5 and 6, the conveying means is provided by a pair of chain link endless belts 35 and 35' which are respectively disposed and retained taut between associated drive sprockets 36 and 36' and associated idler sprockets 37 and 37'. A motor 38 is detachably coupled through a coupling 39 to the drive sprockets 36 and 37. The conveyor rod 24 which provides a hinge connection to the frying basket and transfer chute is attached to a coupling 40 which is secured at a predetermined location between the chain link belts 35 and 35'. Accordingly, the conveyor rod 24 is displaced to predetermined locations by the motor which is controlled by a control circuit 41 which is herein shown in block form but constituted by appropriate electronic circuitry, well known in the art. Timer device(s) 42 is/are associated with a control circuit 41.

Limit switches 43 and 44 are secured to a frame 45 and sense the position of the hinge rod 24 and connects signals to the control circuit 41 of sensed predetermined positions of the conveyor rod and hence the frying basket 22 whereby through the control circuit 41 the conveyor rod may be displaced, as shown in FIG. 7, to a loading position 46, a frying position 47 and an unloading position 48. A pair of switch actuating elements 49 and 50 are secured to one side 35" of the chain link 35.

As shown in FIGS. 1 and 5, the control panel 17 is provided with three pushbutton switches, herein a first pair of switches, namely switches 51 and 52 to select the time cycle that the foodstuff is maintained in the cooking oil. By depressing one of the switches 51 and 52 the control circuit 41 will select a proper timer sequence to maintain the basket 22 in the cooking pot 21. A start switch 53 is also provided to initiate the operation of the conveyor.

Figure 9:
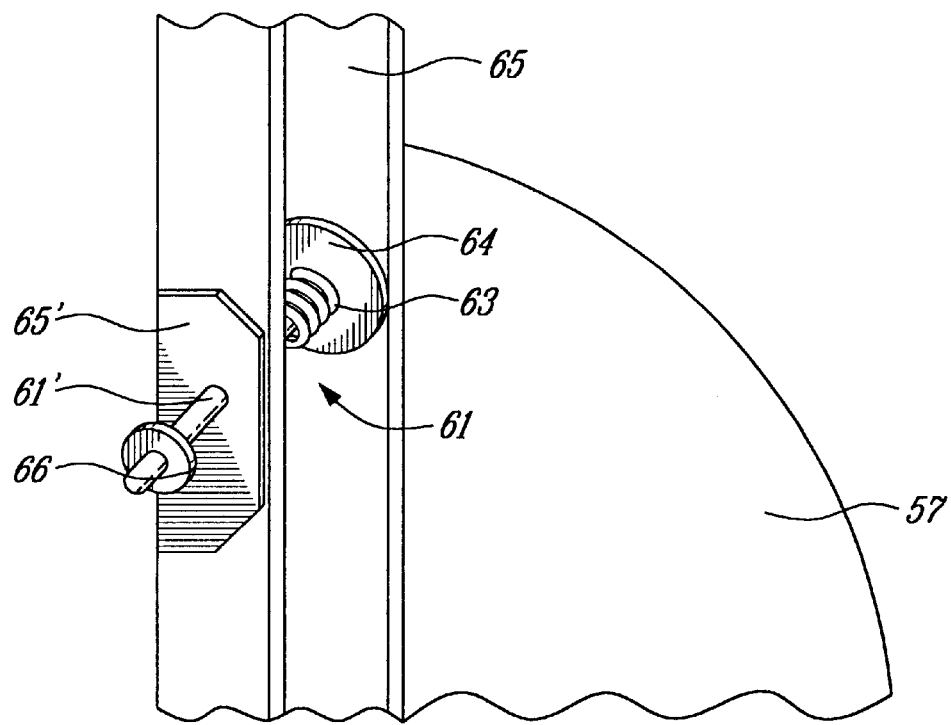
FIG. 9 is a fragmented perspective view illustrating the construction of the spring-biased lock pin associated with the door assembly.
Figure 10:
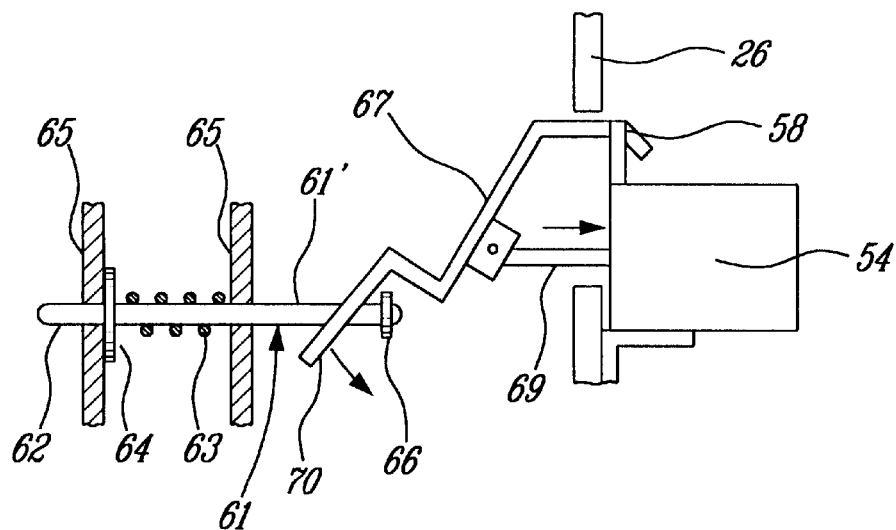
FIG. 10 is a simplified side view showing the construction of the retracting mechanism associated with the lock pin.

When the user depresses one of the switches 51 or 35 52, the controller circuit 41 actuates a piston cylinder 54 which causes the door assembly 13 to automatically open. As shown in FIGS. 8 to 10, the door assembly is comprised of a front closure panel 55 which obstructs the food receiving opening 12, an inner bottom guide wall 56 and spaced inner side walls 57 and 57'. A food trough is defined between the side wall, the front wall and the bottom wall and is hereinshown by reference numeral 58. The bottom wall 57 is angulated downwardly so that when foodstuff is placed within the trough 58, when the door is in an open position, the foodstuff will be automatically released downwardly on the bottom wall 56 when the door is closed. As hereinshown, the door assembly 13 is spring-biased to a closed position, by a retracting spring 59 secured to one of the side walls 57 and the back surface of the door 16.

A locking mechanism is provided to maintain the door assembly 13 in a locked condition when the apparatus is not in use, and will now be described. As shown in FIG. 8, the outer side wall 57 of the door assembly is provided with a pin receiving aperture 60 in a top portion thereof. As specifically shown in FIGS. 9 and 10, a spring-biased lock pin 61 is provided with an engaging free end 62 which is spring-biased against the side wall 57 of the door assembly and positioned to enter the pin receiving aperture 60 whereby to arrest the door assembly in its closed position. A coil spring 63 acts on a washer 64 secured to the lock pin 61 and retained captive between a pair of support walls 65 and 65'. The lock pin 61 extends beyond the wall 65' to define an engageable portion 61'. A lock washer 66 is secured near the opposed end of the engaging free end 62 on the engageable portion 61'.

As shown in FIG. 10, the retracting means is constituted by the piston cylinder 54 which has a pivoting linkage 67 hingedly secured by a hinge connection 68 and operated by the piston cylinder rod 69. The piston cylinder is located behind the partition wall 26 and the linkage 67 extends through the portion wall, as shown in FIG. 2.

Figure 4A:
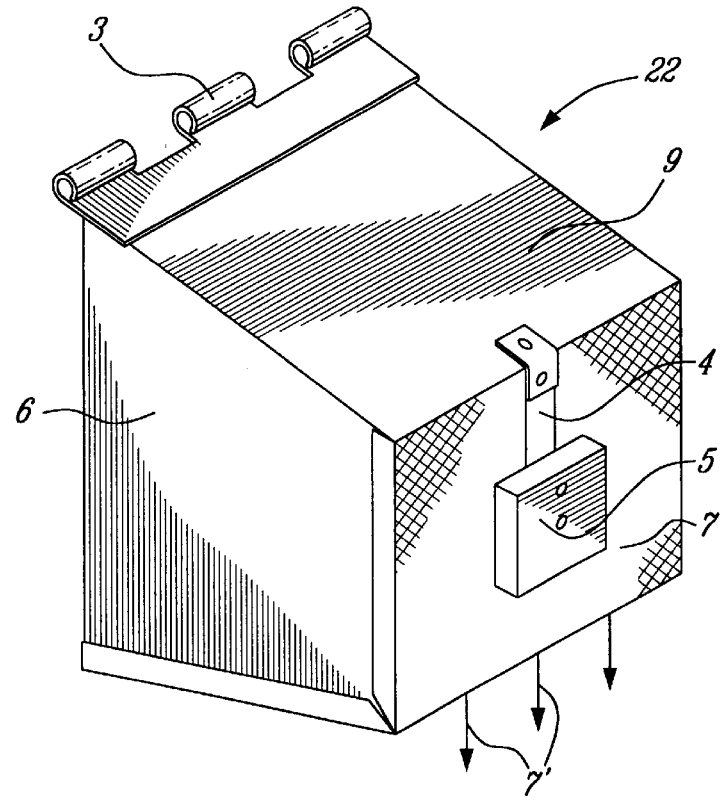
FIG. 4A is a perspective view of the construction of the frying basket.
Figure 4B:
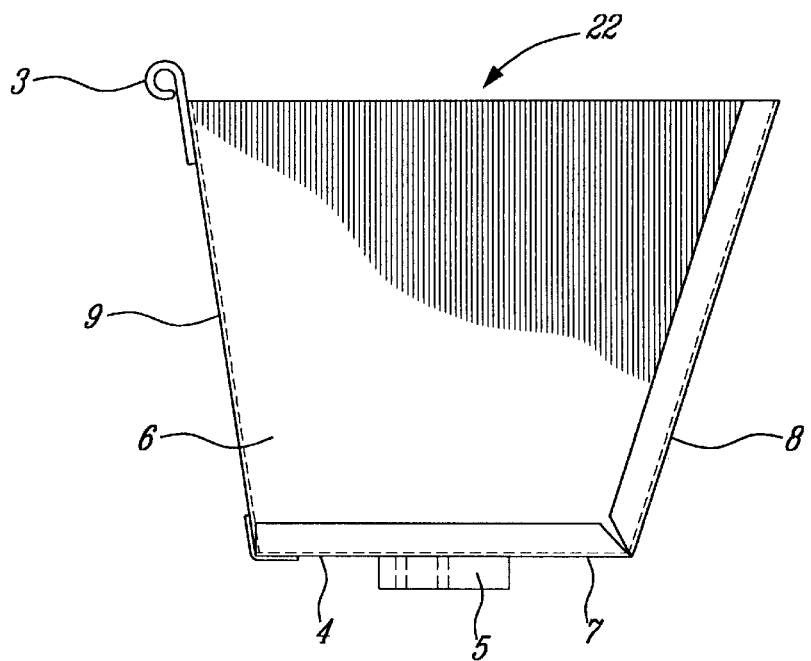
FIG. 4B is aside view of the frying basket.
Figure 4C:
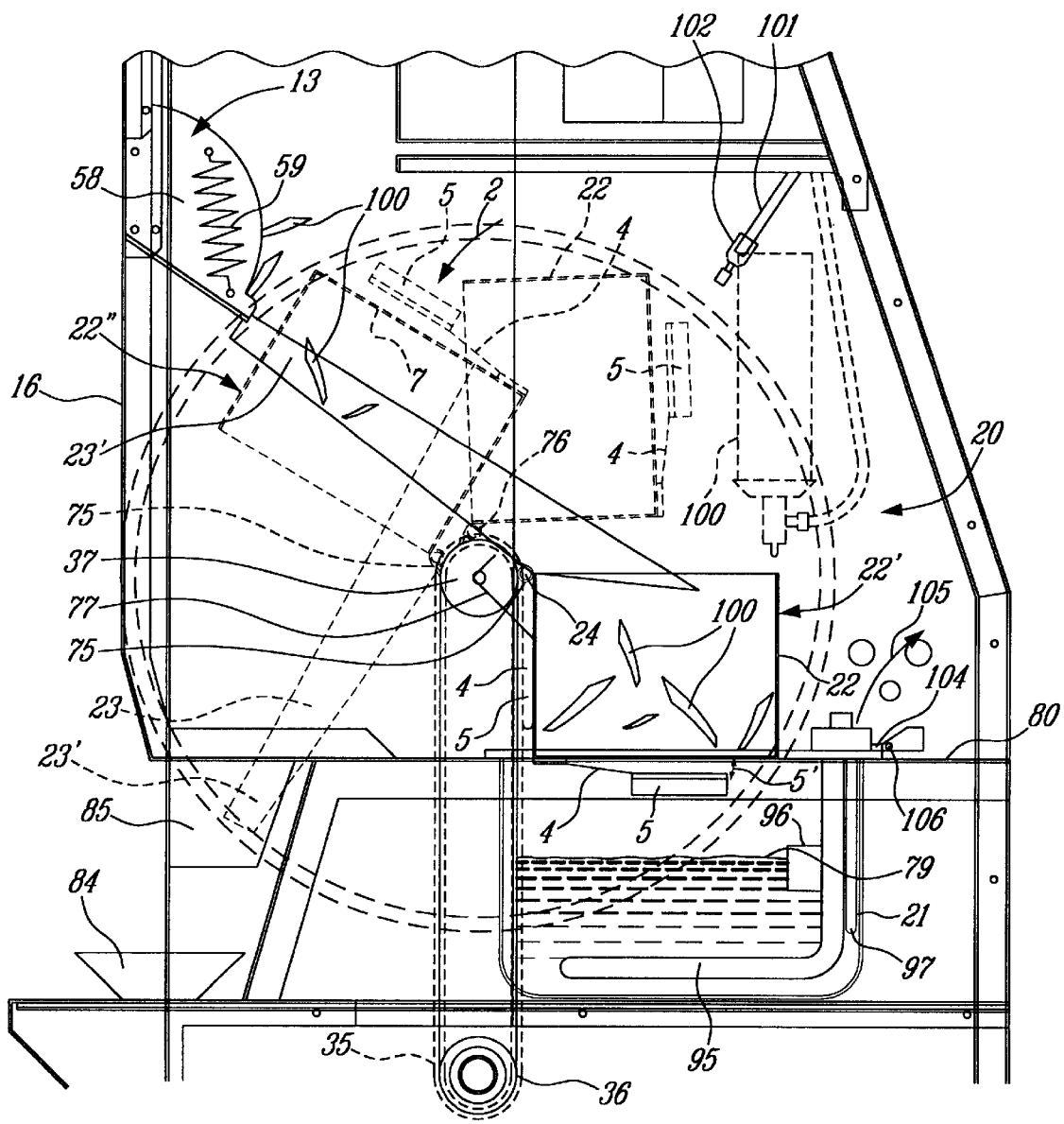
FIG. 4C is a simplified side view showing the displacement of the perforated frying basket by the conveying means and its connection thereto as well as its relationship with the transfer chute.

The pivotal linkage 67 has a finger portion 70 engageable with the washer 66 of the engaging portion 61' of the rod 61. By retracting the piston rod 69, the lock pin 61 will be retracted thereby releasing the door assembly and causing the spring 59, which has been stretched, to urge the door assembly to an open position to expose its trough 58 to permit a user to load the trough 58 with foodstuff 100 to be fried. As previously described, as soon as the user depresses one of the switches 51 or 52, this will actuate the piston cylinder 54 and automatically retract the lock pin releasing the door assembly. Although the front closure panel 55 is hereinshown having a handle 55', this is not necessary as the door is automatically operated and can simply be pushed back inside the housing by applying pressure against the front door panel. Referring to FIGS. 4A and 4B, there is shown the construction of the frying basket 22. It is fabricated from stainless steel or metal plated steel. It has an inclined front wall 9, an inclined rear wall 8, a flat bottom wall 7 and opposed side walls 6. The inclined rear wall 8 and the bottom wall 7 have a diamond shape screen. As shown in FIG. 4A, the diamond shape points down to enhance dripping of cooking oil into the pot in the direction of arrow 7', during displacement of the basket when unloading. The other walls are flat smooth walls causing the cooked fries to slide and unload easily. A hinge 3 is secured to the top edge of the front wall 9. As shown in FIGS. 4A to 4C, a weighted mass 5 is secured on a stainless steel leaf spring 4 and is displaceable against the screened bottom wall 7 to impart percussions or vibrations thereto to shake the oil off the screen walls and assist in vibrating the fries when the basket is at its position 22'. As the frying basket is oscillated at 22', the mass 5 will spring up and down in the direction of arrow 5' and impart percussions on the basket. Also, when the basket reaches its unloading position, at 22", the mass 5 will be urged onto the bottom wall 5, in the direction of arrow 2, to impart a blow to insure that fries do not get stuck to the bottom wall.

With specific reference now to FIG. 4C, the method of operation of the machine will now be described. After a cooking cycle, the control circuit 41 places the frying basket 22 to a loading position as shown in FIG. 4 by reference numeral 22'. The basket 22 has a hinge connection 75 to connect same to the conveyor rod or hinge rod 24. Similarly, the chute 23 also has a hinge connection 76 to connect to the rod 24. As well, the chute 23 has a bracket 77 to maintain a predetermined relationship with respect to the basket 22' although the elements are independently hinged on the same hinge rod 24. Accordingly, when the basket is at its loading position 22', the chute is at its foodstuff receiving and guiding position as shown at 23' such that when the foodstuff 100 is placed in the trough 58 of the door assembly 13, it will be released onto the chute 23 at its position 23' and be guided into the basket 22 at its position 22', as illustrated in FIG. 4.

Once the door is closed, the user then depresses the start switch 53 on the control panel 17. After a predetermined time delay after the door assembly 13 has been closed and the switch 53 depressed, to ensure that the foodstuff 100 has been properly conveyed to the basket, the control circuit 41 will initiate a first cycle for a predetermined time period depending on which of the switches 51, 52 have been depressed. The motor 38 is then actuated to rotate the chain link belt in a predetermined direction as indicated by arrow 78 in FIG. 5 thereby lowering the frying basket 22 into the hot oil 79 contained within the cooking pot 21.

As shown in FIG. 4C, the cooking pot is supported by a support frame 80 which is retractable from the cooking chamber only when the servicing door 16 has been retracted. Once the basket reaches the cooking oil 79, the controller then initiates a reciprocation movement of the motor to cause the basket to move up and down quickly to impart a shaking motion of the basket in the hot oil. This causes the foodstuff 100 to be displaced preventing the foodstuff from sticking together in clumps and also providing better even cooking or frying of the foodstuff. This goes on for a predetermined period of time, depending on which of the switches 51 or 52 have been depressed.

After the cooking cycle, the control circuit then actuates the motor and the basket is conveyed and stopped at the loading position 46 on the retracting cycle and this is detected by the switch actuating elements 49 being displaced by the chain to cause one of the limit switches to be actuated. This sends a signal to the control circuit 41 which then causes the motor to again reciprocate the chain link belt and accordingly causing the basket 22 to shake at its position 22' thereby releasing cooking oil which has adhered to the foodstuff 100 and also to the cooking basket 22. The mass 5 also apply percussions to the basket to shake off the cooking oil. Accordingly, excess oil will drip back into the cooking pot 21.

After a predetermined time limit of reciprocation at position 22', the control circuit 41 causes the motor to continue to rotate to displace the chains 35 and 35' in the direction of arrow 81, as shown in FIG. 5, until the switch actuating element 49 actuates the limit switch 44 signaling the control circuit 41 to stop the motor as the basket has reached its unloading position 48. Immediately, the bottom wall is applied a blow by the mass 5 to prevent fries from sticking to the bottom wall 7. This position is illustrated by reference numeral 22" in FIG. 4. The chute free end 23' is disposed within a discharge funnel 85 associated with the discharge port 14 whereby to guide the cooked foodstuff 100 into the container 84 placed thereunder. The cooking basket is maintained at the discharge position 22" for a predetermined time limit, as determined by the control circuit and its timer, and then the motor is again actuated and the basket is returned to its loading position at 22' or position 46 as shown in FIG. 7, and arrested there as detected by the control circuit 41 and one of the associated limit switches.

As shown in FIG. 3, the filter assembly 31 has a hinge bottom wall 31' which is detachable from its top housing 31" whereby to remove the charcoal filter element 33. The fan 32 is mounted in the top housing 31". The housing 11 of the apparatus is also constructed of wall panels 90. The ventilation of the housing 11 is illustrated in FIG. 1 and as hereinshown when the fan is operating, air is drawn into the discharge port 14 in the direction of arrow 91 and exits from the top of the housing and directed to the outdoors through a duct 92 after the air and the oil odors from the cooking pot have been filtered through a grease entrapment washable filter made of a permanent metal screen. This is the reason why the fan assembly is spaced above the cooking pot and the pot is in the back of the housing. Also, when the door assembly 13 is open, air will also be pulled through that door assembly maintaining the odors inside the housing 11.

In use, a tray or container 84 containing the foodstuff 100 in a frozen or semi-frozen state is emptied within the trough 58 of the door assembly 13, as previously described and the door is closed. As soon as the door 13 closes, the lock pin 61 will engage within the pin receiving aperture 60 as the piston cylinder 69 has returned to its extended position as shown in FIG. 10. It is pointed out that the piston cylinder is only actuated momentarily sufficient only to release the lock pin from the pin receiving aperture freeing the door assembly. The engaging end of the lock pin then abuts the outer surface of the side wall 57 during the loading of the trough in the door assembly and as soon as the door is closed and the pin is aligned with the aperture 60, it engages the door assembly, maintaining it closed and locked.

The resistive heating element 95, shown in FIGS. 3 and 4A, is mounted on a hinged support 104 disposed within the cooking pot 21 and is immersed in the cooking oil for rapid heating of the cooking oil. The hinge support 104 permits the quick removal of the heating element 95 and other elements from the pot to permit withdrawing the pot for cleaning. The assembly is lifted upwardly in the direction of arrow 105, on the hinge connection 106. Level sensing means in the form of an electrical oil level sensor 96 extends in the cooking pot 21 and is connected to the control circuit 41 whereby to stop the operation of the apparatus when the cooking oil reaches a predetermined level or may be provided simply to provide a signal and illuminate a light to indicate that the cooking pot should be refilled. A temperature sensor 97 may also be connected to the support 104 and extends in the cooking pot 21 to detect the temperature of the oil and to signal to the control circuit 41 that the cooking oil has reached the proper temperature for frying. Once that signal is received, the control circuit may render the machine operative and actuate a light to indicate its "ready" state.

As shown in FIG. 4A, a fire extinguisher 100 is mounted in the components chamber and a copper tube 105 extends to the cooking chamber 20 where a nozzle 102 is fitted at the end of the tube and disposed over the cooking pot 21. Should the temperature in the area of the nozzle 102 exceed 200° F., an extinguishing gas would be released to extinguish quickly a fire. The capacity of the extinguisher 100 is 94 cubic ft. while the entire chamber is only 1.2 cubic ft. Accordingly, there are ample chemicals to extinguish any fire.

It is within the ambit of the present invention to cover any obvious modifications of the preferred embodiment described herein. For example, the machine may be provided with brackets whereby to removably secure it to a support surface. Needless to say, because the machine utilizes hot frying oil, it is important to prevent any accidents to the users. For this reason, the machine is provided as a sealed unit and access to the interior thereof can only be provided to authorized personnel. For this purpose lock cylinders, such as cylinder 99, are provided to lock the doors 19 and 16.

We claim:

1. An apparatus for frying food, said apparatus comprising a housing, said housing having a food receiving opening and a discharge port, a food frying pot in said housing, a heating element for heating frying oil disposed in said pot, a perforated frying basket hingedly secured to a conveying means, a transfer chute associated with said perforated frying basket; control means for operating said conveying means to convey said frying basket along said conveying means to a food receiving position, a food frying position, and a food discharge position; said positions being spaced from one another along said conveying means, said transfer chute directing foodstuff into and out of said frying basket when said basket is at said food receiving position and said food discharge position, respectively, basket shaking means to shake said frying basket when disposed at a predetermined location to provide a high quality fried foodstuff, and ventilation means for venting air from said housing, said basket shaking means being constituted by reciprocating said conveying means and thereby said basket when said basket is disposed in said cooking pot to achieve more evenly fried foodstuff and prevent clustering of said foodstuff during cooking; said basket being further reciprocated when said basket is arrested at said loading position and above said frying pot whereby to shake off excess frying oil, in a return cycle only, from said foodstuff to provide foodstuff which contain less frying oil on their outer surface and also prevents sticking of the foodstuff to the frying basket, said basket having percussion means displaceably secured adjacent a bottom wall of said frying basket and immovable in said frying oil during frying, said percussion means impacting said bottom wall to impart vibration to said frying basket when at said loading position in said return cycle, and to impart percussion to said bottom wall at said discharge position to dislodge any french-fries sticking thereto.

2. An apparatus as claimed in claim 1 wherein said percussion means is a mass secured to a leaf-spring and disposed on said bottom wall.

3. An apparatus as claimed in claim 1 wherein said conveying means is a displaceable element which is movable by a motor drive, a hinge connection member secured to said displaceable element, said basket and said transfer chute being hingedly connected to said hinge connection member.

4. An apparatus as claimed in claim 3 wherein said displaceable element is an endless belt-like member controllably displaceable between a drive wheel and an idler wheel, said motor drive being connected to said drive wheel and operated by said control means.

5. An apparatus as claimed in claim 4 wherein position sensing means is associated with said belt-like member to sense predetermined positions thereof.

6. An apparatus as claimed in claim 5 wherein said belt-like member is a pair of chain link endless belts, said drive wheel and idler wheel being pairs of chain sprockets, said sensing being constituted by a first and a second limit switch operated by switch actuating elements secured to one of said chain link endless belts at said predetermined positions.

7. An apparatus as claimed in claim 3 wherein there is further provided a hinged door associated with said food receiving opening, and lock means to secure said door in a closed position to prevent access to said opening during a frying cycle of operation of said apparatus and to automatically open said door upon actuation of a selection switch by a user person.

8. An apparatus as claimed in claim 7 wherein said door has a door assembly comprised of a front closure panel to obstruct said food receiving opening, an inner bottom guide wall and spaced inner side walls; said bottom guide wall, front closure panel and spaced inner wide walls defining a foodstuff receiving trough, said trough releasing foodstuff placed thereon onto said transfer chute when said door is closed.

9. An apparatus as claimed in claim 8 wherein said door assembly is spring-biased to an open position by spring means.

10. An apparatus as claimed in claim 9 wherein said lock means is comprised of a spring-biased lock pin having an engaging free end spring-biased against one of said spaced inner side walls of said door assembly, and an aperture in said one of said spaced inner side wall to receive said engaging free end of said lock pin to retain said front closure panel in obstructing position against said food receiving opening, and retracting means to retract said pin to cause said door assembly to be displaced automatically to said open position by said spring means.

11. An apparatus as claimed in claim 10 wherein said retracting means is a lock pin retracting finger operated by a piston which is actuated by said control means upon said actuation of a selection switch by a user person.

12. An apparatus as claimed in claim 7 wherein there are two of said selection switches, each switch being associated with a different cooking cycle programmed by timer circuits of said control means.

13. An apparatus as claimed in claim 12 wherein there is further provided a start switch connected to said control means and operable by a user person to cause said control means to initiate a cooking cycle wherein said motor drive will be operated by said control means to displace said perforated basket into said frying pot for a predetermined period of time, cause said motor to reciprocate to constitute said basket shaking means during said predetermined period of time, then move said basket back to said loading position and again reciprocate said basket for a further period of time, then displace said basket to said discharge position where fried foodstuff is directed to said discharge pot by tilting said basket over a receiving end of said transfer chute which guide said fried foodstuff to said discharge position.

14. An apparatus as claimed in claim 1 wherein there is further provided a collecting tray which is slidingly retained under said discharge port and extending into said housing under said food frying pot to collect any oil or other matter directed thereon.

15. An apparatus as claimed in claim 1 wherein said ventilation means is a filter and ventilation fan mounted in a top wall of said housing spaced above said cooking pot, said discharge port providing an air vent for said housing.

16. An apparatus as claimed in claim 1 wherein said apparatus is a french-fries frying apparatus, there being provided a predetermined quantity of french-fries packaged for insertion into said food receiving opening, and receptacle means adapted to be positioned under said discharge port to receive said predetermined quantity of french-fries after having been fried in said cooking pot for a predetermined period of time as selected by a user person.

17. An apparatus as claimed in claim 1 wherein said heating element is a wound resistive element capable of rapid heating of cooking oil placed in said cooking pot, level sensing means to sense the level of oil in said pot, and temperature sensing means to sense the temperature of said cooking oil, said level and temperature sensing means feeding information signals to said control means.

18. An apparatus as claimed in claim 1 wherein there is further provided a servicing door in said housing to permit access to a cooking chamber for servicing same, and door position sensing means connected to said control means to disable said control means when said servicing door is in an open position.

19. An apparatus as claimed in claim 18 wherein said cooking chamber is shielded from said control means and some associated sensing and switching devices as well as said conveying means by a division wall, and a configured guide slot opening in said division wall for the passage and displacement of a hinge connection member secured to said conveying means and to which said perforated frying basket and said transfer chute are hingedly connected.

20. An apparatus as claimed in claim 18 wherein a fire extinguishing head is disposed in said cooking chamber for releasing a fire extinguishing gas when the temperature in said cooking chamber exceeds a predetermined limit.

* * * * *